INVENTORS
John H. Beyer
Alfred Boyles

United States Patent Office

3,464,253
Patented Sept. 2, 1969

3,464,253
METHOD FOR ROUNDING PIPE
John H. Beyer, Beverly, and Alfred Boyles, Burlington, N.J., assignors to United States Pipe and Foundry Company, Birmingham, Ala., a corporation of New Jersey
Filed June 29, 1967, Ser. No. 649,920
Int. Cl. B21d 31/00, 3/08
U.S. Cl. 72—364                                                  5 Claims

ABSTRACT OF THE DISCLOSURE

The invention provides a method and apparatus for bringing out-of-round pipe into truer circular shape which comprises slowly rotating hot pipe for a few revolutions while applying a load which deflects the pipe from its circular shape.

BACKGROUND OF THE INVENTION

Field of the invention

In the manufacture of ductile iron pipe, particularly in sizes over 12″ in diameter, ovalness of the pipe is a serious problem. The centrifugal molds in which the pipe are cast are round, but the pipe cast in them generally exhibit some degree of ovalness after they are extracted, annealed and cooled to room temperature. Although specifications permit a small degree of ovalness, it is difficult to maintain pipe roundness within the permitted range.

Prior art

Many attempts have been made to solve the ovalness problem. To prevent ovalness caused by stresses created by uneven cooling of the pipe after they are extracted from the casting machine, the pipe in some instances are placed on rollers as soon as they are extracted from the casting machine and slowly rotated during cooling. In efforts to prevent the pipe from sagging under their own weight while being rolled through a horizontal annealing oven, various procedures have been followed. For example, the rate of travel of the pipe in the oven has been increased, the pipe in some instances have been annealed in a vertical position, and provision has been made in horizontal annealing ovens to provide rotation in addition to that provided by rolling the pipe through the oven.

In addition to procedures designed to prevent or minimize ovalness during manufacture, it has been necessary to provide for mechanical rounding of the spigot portion of the pipe when the pipe have cooled following the annealing operation, for example, by means of jacks. This has been unsatisfactory for in addition to being labor consuming and costly, only the spigot portion of the pipe is rounded thus creating problems if the pipe is cut in the field.

SUMMARY OF THE INVENTION

The present invention provides a rapid, economical, production line apparatus and method for rounding pipe which gives positive results and permits the entire pipe body to be rounded. In general, the method comprises heating the pipe to a temperature within the range of 1000° to 1400° F., supporting the pipe on rollers, applying a load to deflect the pipe in the transverse direction from its circular shape and rotating the pipe for a few revolutions while so deflected.

DESCRIPTION OF PREFERRED EMBODIMENTS

Figure 1:
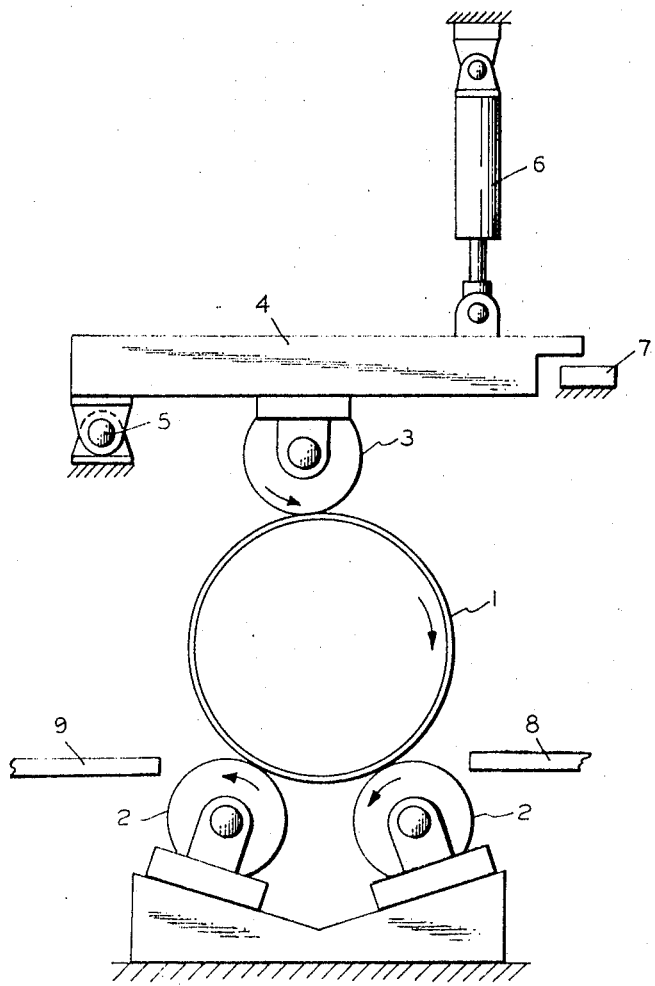
FIGURE 1 illustrates an apparatus for carrying out the invention wherein the deflecting load is applied by means of an externally applied roller and FIGURE 2 illustrates an apparatus wherein the deflecting load is applied by means of an internally applied roller.

In FIGURE 1, the pipe 1 which is to be rounded is mounted on support rollers 2, one or both of which are driven by power means not shown. Work roller 3 is mounted above pipe 1 on a support 4 which pivots about pin 5. Work roller 3 is pressed against pipe 1 by means of hydraulic cylinder 6. In order to provide a positive limit to the downward movement of work roller 3, or in other words, to limit the deflection of pipe 1, a stop means 7 is provided. Thus, when a downward force is exerted by cylinder 6, pipe 1 can only be deflected until the end of support 4 bears against stop 7. This stop can be made adjustable in height so that either the amount of deflection or the diameter of pipe being rounded can be changed.

Since the pipe to be rounded will generally be 18-20 feet in length, each end of work roller 3 will be mounted as illustrated on a beam support 4, the two supports being joined together by cross beams to form a unitary structure and a duplicate operating cylinder and stop means being provided at the opposite end of roller 3 to give uniform movement over the length of the roller. However, if shorter lengths of pipe or only the end portions of pipe are to be rounded, a single operating cylinder and stop means may be sufficient. Support rollers 2 and work roller 3 can each be a single roller approximately as long as the pipe to be rounded or be made up of two or more rollers mounted side by side in the axial direction to give the effect of a single roller. Although a single work roller is illustrated, other arrangements such as a pair of parallel rollers can be used to obtain the desired deflection of the pipe. Also, the load applied can be either a single load applied as illustrated or it can be several loads, applied by hydraulic cylinders or other means, which will give the desired deflection.

Figure 2:
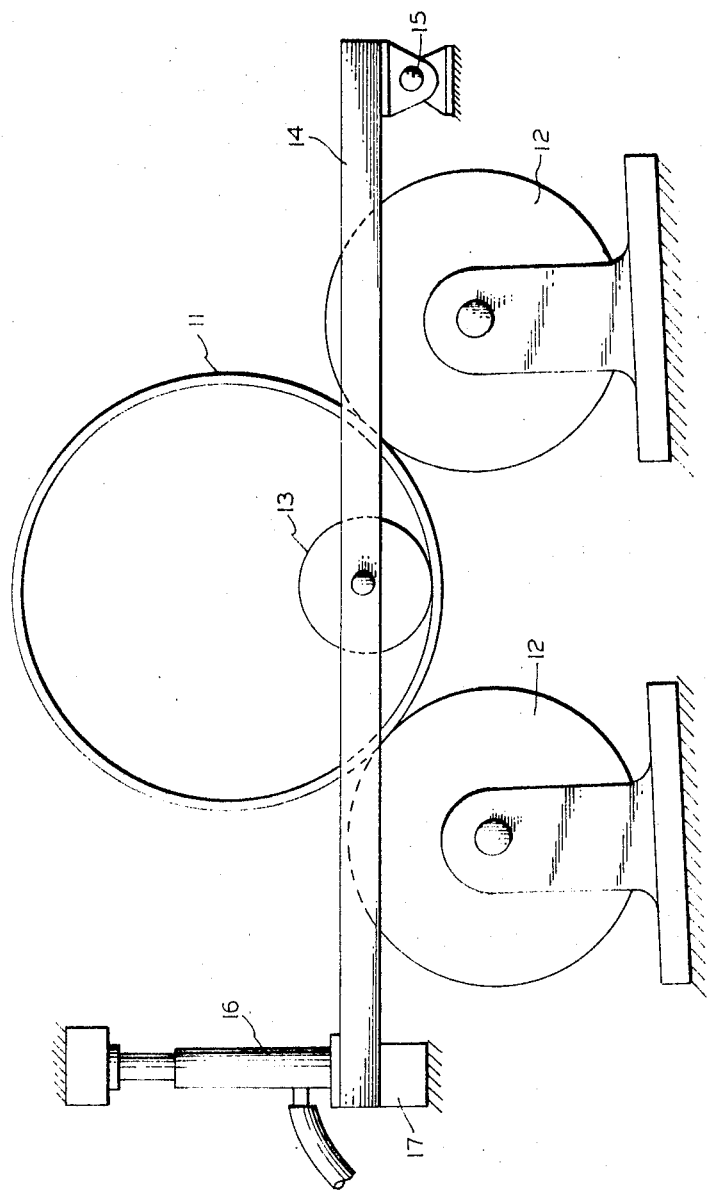

In FIGURE 2, an apparatus is illustrated wherein pipe 11 is placed on support rollers 12, at least one of which is driven, and the work roller 13 is applied to the internal surface of the pipe. Roller 13 is mounted on beam 14 which is pivotably mounted on pin 15 at one end. To obtain deflection of the pipe, the free end of beam 14 is forced downward by means of hydraulic jack 16 against stop 17. In view of the obvious difficulties in setting up such an arrangement for rolling long lengths of pipe where it would be necessary to support roller 13 at both ends, such an arrangement is best suited for use where only the end portion of the pipe is to be rounded. For such use, the roller 13 could be mounted in cantilever fashion on beam 14 and easily moved into engagement with the end of the pipe.

In carrying out the method of the invention, the pipe to be rounded is heated to a temperature of 1000°–1400° F., moved into position on support rollers 2, deflected transversely by work roller 3, and rotated for a few revolutions. With proper conditions and procedures, the pipe will be rounded with sufficient accuracy to meet established limits on ovalness.

The preferred pipe temperature for carrying out the rounding operation is about 1300° F. The pipe can readily be removed at this temperature from the annealing furnace which is normally used to ferritize the pipe; therefore, in practice it will be desirable to place the rounding apparatus in the pipe processing run at the annealing furnace exit. The pipe will roll from the annealling furnace to the rounding apparatus on a pair of rails 8 and then from the rounding apparatus to the next processing station on a pair of rails 9. If the pipe leaves the annealing furnace at slightly above 1300° F. and is quickly moved into the rounding apparatus, the rounding operation can commence about 1300° F. It is important that the pipe be moved from the annealing furnace to the rounding apparatus as quickly as possible because the pipe cools very rapidly and the forces required to work the pipe increase greatly as the pipe cools. For example, tests carried out a pipe having an inside diameter of 24 inches and a wall thickness of approximately ½ inch revealed that it will cool from 1300° F. to 1000° F. in 4–5 minutes and that the force required to obtain a ½ inch transverse or diametrical deflection in a ring 6 inches long increases from 700 pounds at 1300° F. to 1750 pounds at 1000° F.

As soon as the hot pipe has been placed on the support rollers, the work roller is forced downward by cylinder 6 (FIGURE 1) or jack 26 (FIGURE 2) thereby deflecting the pipe. The amount of deflection cannot be precisely defined and will of course vary according to pipe diameter, metal thickness and pipe temperature. However, generally speaking the deflection required to round pipe will be slightly in excess of that required to provide a permanent set in the pipe. In more practical terms the deflection required for pipe in the 16–36 inch diameter range will be in the range of ¼–1 inch, or more specifically in the range of ⅜–¾ inch. Using an apparatus similar to that illustrated in FIGURE 1 tests were conducted on 24 inch pipe using approximately ⅝ inch deflection with very good results, e.g., a 36 inch pipe that was ⅞ inch out of round before rounding was only 1/16 inch out of round after the test. With the apparatus of FIGURE 2, satisfactory results were obtained using a deflection of ⅜ inch. The use of too little deflection will not give the desired results, and the use of too much can result in increased ovalness.

At the same time the work roller is being forced down on the pipe, rotation of the pipe should begin so that the rounding operation can be completed with a minimum decrease in pipe temperature. The pipe is rotated slowly, just a few revolutions per minute, while held deflected by the work roller. The pipe will be rounded during the first five or six revolutions, and the operation should be stopped at that time. Continued rolling does no good and may actually increase the diameter of the pipe, and if rotation is continued for several minutes, the forces required to maintain the pipe deflected and to rotate the pipe will increase rapidly as the pipe cools.

From the foregoing it is apparent that the present invention permits rapid, economical and dependable processing of pipe on a production line basis whereby excessive ovalness is eliminated. While there have been illustrated and described presently preferred embodiments of the invention, they have been set forth as illustrations of the invention and not as limitations on the invention. It will be apparent to those skilled in the art that changes may be made in the form of the apparatus and the procedures described without departing from the scope and spirit of the invention as set forth in the appended claims.

What is claimed is:

1. Method for rounding a pipe comprising heating the pipe to a temperature within the range of 1000° F.–1400° F., transversely deflecting the pipe from its generally circular shape with sufficient stress to provide a slight permanent set upon removal of the stress, and moving the stress circumferentially about the pipe until the pipe will assume a circular shape upon removal of the stress.

2. Method according to claim 1 wherein the pipe is supported on and is deflected by means of parallel opposing rollers.

3. Method according to claim 1 wherein the pipe is transversely deflected at least one-quarter of an inch but not in excess of one inch.

4. Method according to claim 1 wherein the pipe is transversely deflected at least three-eighths of an inch but not in excess of three-quarters of an inch.

5. Method according to claim 2 wherein the pipe is held deflected through about six revolutions.

References Cited
UNITED STATES PATENTS

| | | | |
|---|---|---|---|
| 455,186 | 6/1891 | Elmore | 72—110 |
| 2,550,842 | 5/1951 | McClure et al. | 72—121 |
| 3,213,659 | 10/1965 | Armstrong | 72—69 |

FOREIGN PATENTS

| | | |
|---|---|---|
| 763,565 | 5/1934 | France. |
| 944,318 | 12/1963 | Great Britain. |

CHARLES W. LANHAM, Primary Examiner

L. A. LARSON, Assistant Examiner

U.S. Cl. X.R.

72—110, 367